(12) United States Patent
Zhou et al.

(10) Patent No.: US 9,111,247 B2
(45) Date of Patent: Aug. 18, 2015

(54) SYSTEM AND METHODS FOR EXCESS CAPACITY IN DYNAMIC PRODUCTION SYSTEMS

(75) Inventors: Rong Zhou, San Jose, CA (US); Sudhendu Rai, Fairport, NY (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 128 days.

(21) Appl. No.: 13/606,861

(22) Filed: Sep. 7, 2012

(65) Prior Publication Data
US 2014/0071480 A1 Mar. 13, 2014

(51) Int. Cl.
*G06F 15/00* (2006.01)
*G06Q 10/06* (2012.01)

(52) U.S. Cl.
CPC .................................. *G06Q 10/0633* (2013.01)

(58) Field of Classification Search
CPC .............................. G06F 3/1275; G06F 3/1263
USPC ........................................................ 358/1.15
See application file for complete search history.

(56) References Cited

U.S. PATENT DOCUMENTS

| | | | |
|---|---|---|---|
| 6,993,400 B2* | 1/2006 | Viassolo | 700/99 |
| 8,028,293 B2* | 9/2011 | Azar et al. | 718/105 |
| 2007/0091355 A1* | 4/2007 | Rai | 358/1.15 |
| 2007/0247659 A1* | 10/2007 | Zhang et al. | 358/1.15 |
| 2010/0238484 A1* | 9/2010 | Komine | 358/1.15 |
| 2011/0066269 A1 | 3/2011 | Zhou et al. | |
| 2012/0081744 A1* | 4/2012 | Kadota | 358/1.15 |
| 2012/0099139 A1 | 4/2012 | Zhou et al. | |

OTHER PUBLICATIONS

U.S. Appl. No. 13/156,573, entitled "System and Method for Multi-Site Cellular Manufacturing With Transportation Delays", filed Jun. 9, 2011, by Zhou et al.

* cited by examiner

*Primary Examiner* — Saeid Ebrahimi Dehkord
(74) *Attorney, Agent, or Firm* — Fay Sharpe LLP (57) ABSTRACT

The present application presents a new and improved system and method of enhanced Lean Document Production (LDP), which employs cellular manufacturing concepts. The LDP process utilizes a processor to compute a dynamic production algorithm to generate an indication of a manufacturing or print shop excess capacity level.

20 Claims, 9 Drawing Sheets

PRINTING WORKFLOW SYSTEM

SYSTEM AND METHODS FOR EXCESS CAPACITY IN DYNAMIC PRODUCTION SYSTEMS

BACKGROUND

The present exemplary embodiment relates to Lean Document Production (LDP) for excess capacity in dynamic production and manufacturing. It finds particular application in conjunction with document printing operations and will be described with particular reference thereto. However, it is to be appreciated that the present exemplary embodiment is also amenable to other applications.

Conventional print shops are organized in a manner that is functionally independent of the print jobs, the print job mix, and the total volume of print jobs passing through the system. The conventional print shops operate in a dynamic environment in which the set of production jobs is neither fixed nor has known a priori. The print shops have the flexibility to accept or reject certain print jobs, in order to maximize revenue or minimize operational costs. Operators of print shops often need to know what level of excess capacity their shops have in order to decide whether the print shop can handle additional jobs, and if so how many. The print shops traditionally measure the level of excess capacity for the shop in terms of the utilization levels of individual equipment. For example, in a document production environment, excess capacity is expressed as a printer A being busy X % of the time or inserter B being Y % utilized.

While utilizing the excess capacity of individual machines requires an array of innovations to make document production a "lean" process, the concept of cellular manufacturing remains at the heart of this technology, and this has created a number of technical challenges, the most notable of which is how to measure and utilize excess capacity of an entire print shop efficiently in a manufacturing environment that is organized around the notion of cells. The implication of this is that if the excess capacity of a piece of equipment such as a printer is measured without regard to the excess capacity of other equipment used for the same print job, then one would effectively create a gap between the excess capacity levels of different (types of) machines that must be closely involved in order to complete a single or multiple manufacturing jobs. Besides the emergence of measuring and utilizing excess capacity of an entire print shop, there are a number of other issues that pose additional challenges to operators employed in LDP systems.

One issue is that since most print jobs require using more than one type or piece of equipment at different times during the printing process, it is unclear how the utilization level of an individual piece of equipment can be combined to capture the utilization level of the print shop as a whole.

Another area where issues exist is that since print jobs have non-uniform or sporadic arrival times and due dates, in most cases the excess capacity of the print shop is irregular and non-static. The excess capacity may fluctuate depending on the time of day or day of the month. In general, the excess capacity is lower during peak production times than during off-peak times.

An additional issue is that variance of jobs in a job mix. This refers to the fact that print jobs (especially the ones found in large print shops) vary significantly in sizes, arrival times, and due dates, such that the equipment required for each job can no longer be sufficiently characterized by any "textbook" distribution pattern (such as normal or exponential distributions) that has a finite variance. For example, as the percentage of long jobs versus short jobs changes, a print shop may exhibit higher or lower levels of excess capacity. Given that many scheduling algorithms and systems do not take into account the effect of job sizes, arrival times, and due dates on the overall capacity of a print shop, new schedulers are needed to meet this challenge. To address these shortcomings and give the shop operator a global view of excess capacity, the present application presents a system and method that effectively aggregates the idle capacity of the production equipment to compute the shop-level excess capacity.

BRIEF DESCRIPTION

The present application presents a new and improved system and method of enhanced Lean Document Production (LDP), which employs cellular manufacturing concepts. The LDP process utilizes a processor to compute a dynamic production algorithm to generate an indication of a manufacturing or print shop excess capacity level.

INCORPORATION BY REFERENCE

U.S. patent application Ser. No. 13/156,573, by Zhou et al., entitled, "SYSTEM AND METHOD FOR MULTI-SITE CELLULAR MANUFACTURING WITH TRANSPORTATION DELAYS"; U.S. patent application Ser. No. 12/911,766, by Zhou et al., entitled, "SYSTEM AND METHODS FOR ADAPTIVE LOT SIZING IN CELLULAR MANUFACTURING"; U.S. patent application Ser. No. 12/558,879, by Zhou et al., entitled, "SYSTEM AND METHODS FOR DYNAMIC SCHEDULING IN CELLULAR MANUFACTURING WITH BATCH-SPLITTING", each of the above being incorporated herein by reference in their entirety.

DETAILED DESCRIPTION

The disclosed embodiments contemplate the use of a lean production process server (LPPS) or other electronic processor running appropriate software to act as a scheduler for coordinating production of document processing jobs in a document factory (such as a print shop). The server exploits lean production techniques to control document processing jobs, and can be run on a number of different platforms, including but not limited to, UNIX and Windows ("UNIX" is a registered trademark of the Open Source Group, while "Windows" is a registered trademark of Microsoft Corporation) based-platforms. Alternatively, the server may run as a standalone executable program regardless of the platform. The server determines workflow priorities and manages workflow accordingly. Those skilled in the art will appreciate that the presently disclosed embodiments may also be practiced with platforms that run other varieties of operating systems. Moreover, the server need not run on a dedicated computer system but rather may run on another variety of electronic devices, such as a printer, copier, etc. Workflow priorities for document processing jobs can be determined by observing the various jobs processing units.

At least one illustrative embodiment disclosed herein presumes that the document factory has been partitioned into autonomous cells. Each cell is a logical grouping of resources in the document factory that is sufficient for completing at least one type of document processing job. Thus, a first cell may include a printer and binder whereas a second cell may include a copier and a collator. The LPPS is responsible for distributing document processing jobs among such cells in an efficient manner.

In at least one embodiment, the excess capacity of a dynamic production system is evaluated and the unused portion of production capacity is translated into business terms such as revenue or profit loss due to underutilization of resources. The dynamic production system can dynamically create new jobs to take advantage of the excess capacity without causing extra delays in the production. This present application helps operators better understand and utilize excess production capacity for improved revenue and profit generation.

Figure 1:
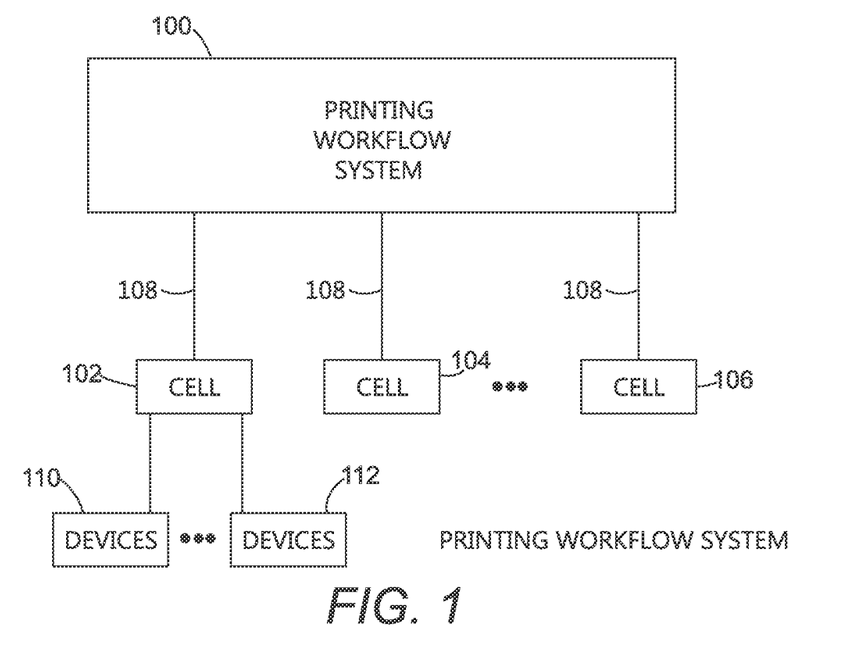
FIG. 1 is a block diagram illustrating a print workflow system in combination with cells and their corresponding devices.

Referring to FIG. 1 a printing workflow system 100 in a print shop (i.e., a document factory) is shown. The printing workflow system 100 which includes at least one processor, such as an electronic processor configured to operate software, controls a multitude of cells 102 through 106, and sends information to and receives information from the cells 102 through 106 via communication links 108. The cells 102 through 106 are comprised of at least one device for assisting in completing a document processing job of given product-types. For example, printing device 110 could be a 600 dpi monochrome printer, while printing device 112 could be a 1200 dpi color printer. These of course are only examples and many other processing devices may be within a cell.

Figure 2:
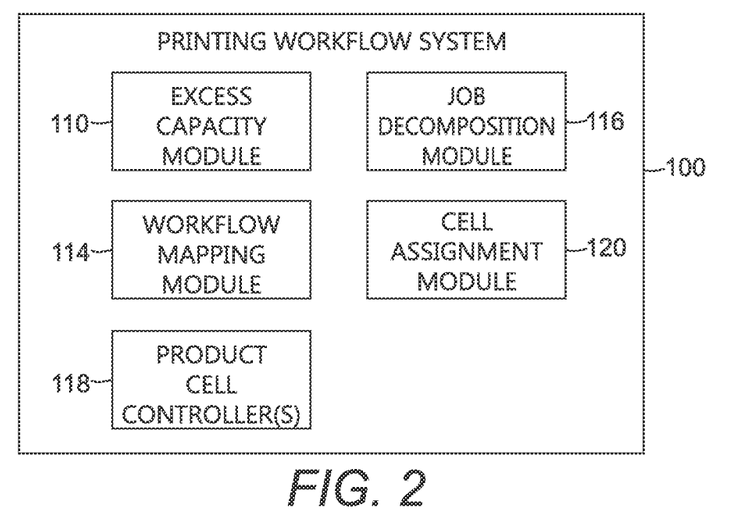
FIG. 2 is a block diagram including software components employed in the print workflow system of FIG. 1.

Referring to FIG. 2, several of the types of modules which may be employed in printing workflow system 100 are shown. These modules include an excess capacity module 110 that evaluates the excess capacity of a dynamic production system and the unused portion of production. The excess capacity module 110, among other things, determines when and how many jobs to add based on a shop's overall excess capacity. A workflow mapping module 114 that determines the workflow for selected document processing jobs. The workflow module, among other things, identifies the operational steps needed to complete a document processing job, and the sequence in which these operational steps should be performed. A job decomposition module 116 is included for splitting the document processing jobs into batches (also called herein as lots) or sub-jobs and for sending the batches to cells for completion. A product cell controller (PCC) 118 may be provided at given cells for receiving at least one batch to be processed by a device in the cell. A cell assignment module 120 is provided for assigning batches to be processed by a cell.

In general, a print job is received, and a workflow is developed for the print job by workflow mapping module 114. Job decomposition module 116 splits the job into batches, with the batches or job then being assigned to cells (e.g., 102 through 106) for completion by cell assignment module 120. The batches are sent to product cell controller 118 of the assigned cells, where each batch is further sub-divided. Excess capacity module 110 measures the excess capacity of the printing system and determines how much and when excess capacity is or will be available.

Figure 3:
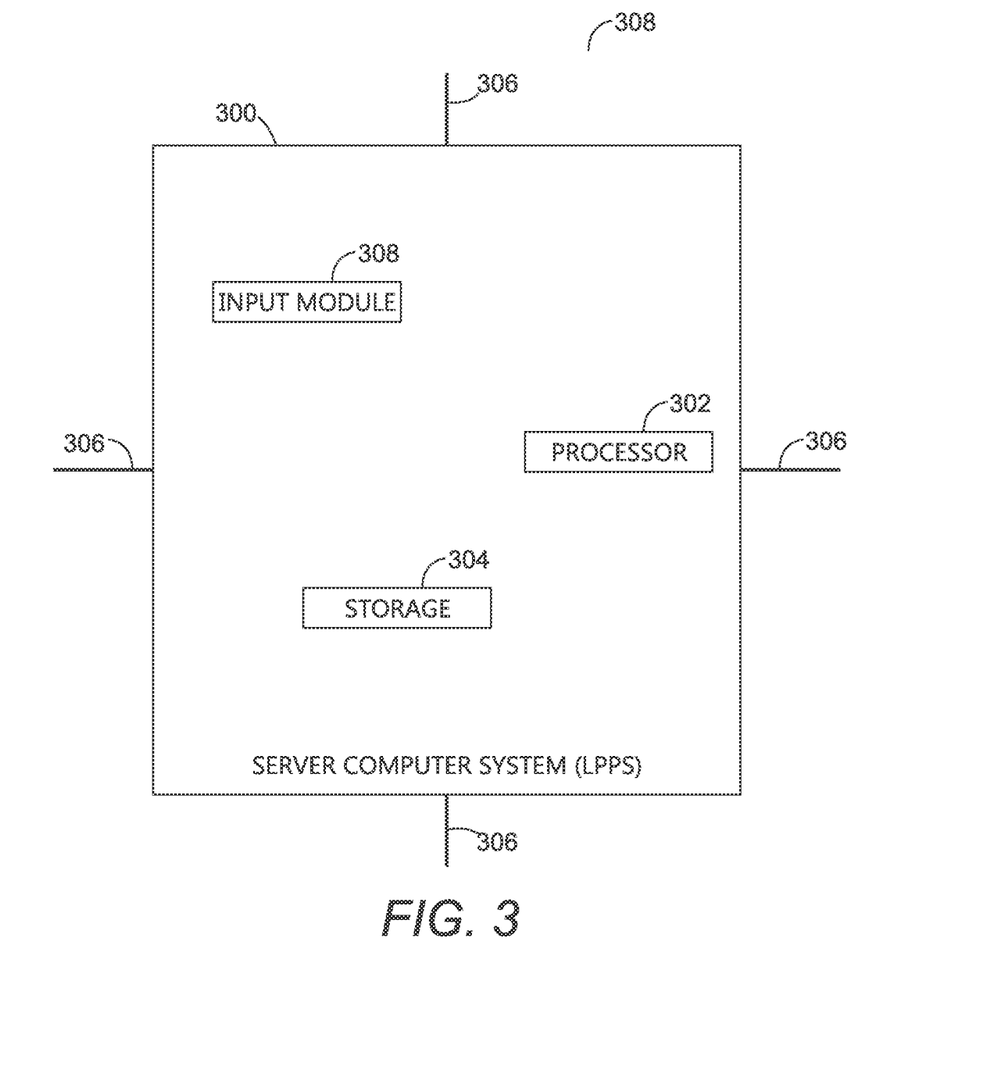
FIG. 3 is a block diagram of a server employing the printing workflow system of FIG. 1.

Referring to FIG. 3, illustrated is one example of a server 300 (i.e., LPPS) suitable for use in printing workflow system 100. Server 300 includes a processor arrangement 302, memory storage 304, communication links 306, and input module 308. The input module 308 is used to receive input from various devices via communications links 306. The input module 308 receives the document processing jobs on behalf of server 300. The processor arrangement 302 executes the programming instructions on server 300 to manage document processing jobs. The server 300 stores the instructions in storage 304. For example, data of modules 110, 114, 116, and 118 (of FIG. 2) and other data may be stored in storage 304. Data of module 120 may be executed on server 300 or a separate server that is particular to a cell.

Figure 4:
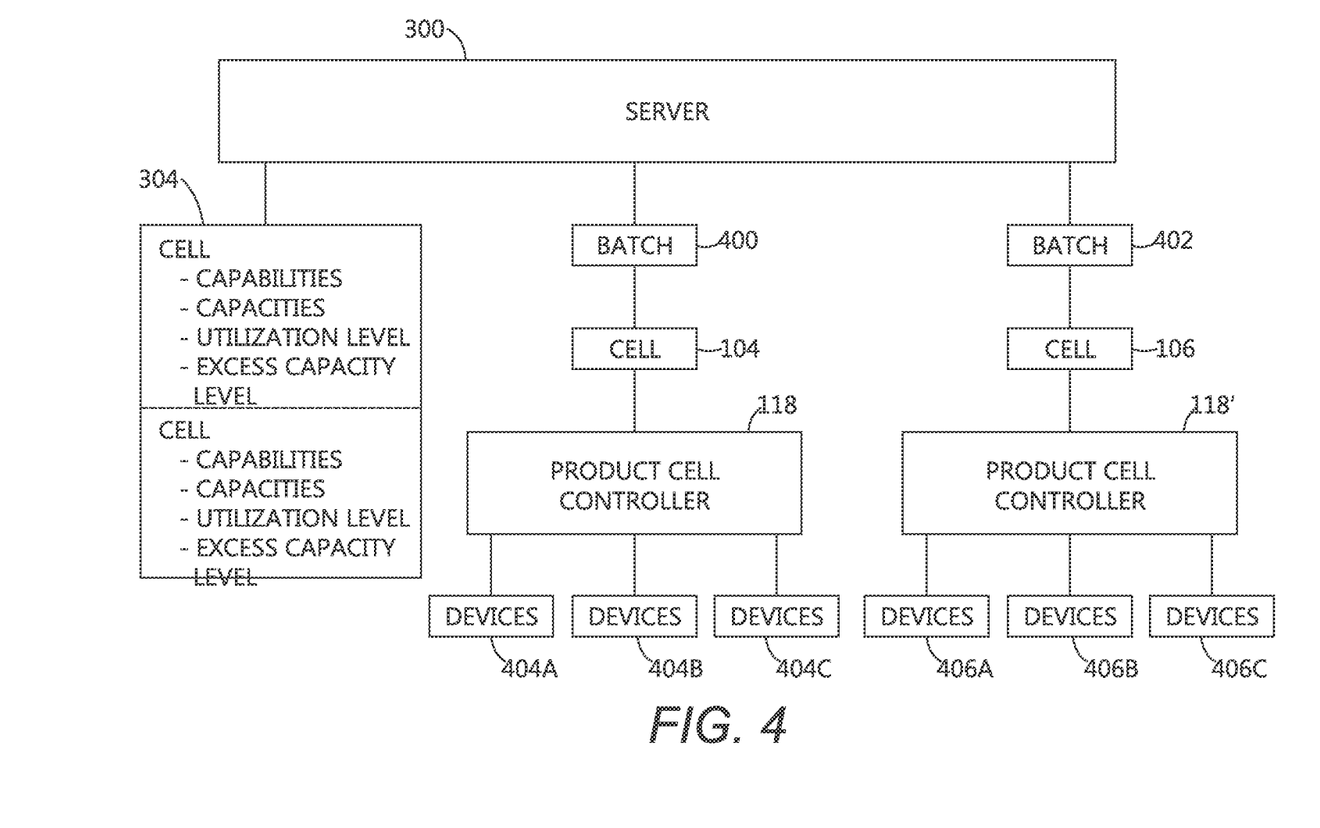
FIG. 4 is a block diagram illustrating how the print workflow system is used to accommodate the splitting of a document processing job into sub-jobs.

Referring to FIG. 4, shown is an arrangement with server 300 of printing workflow system (such as printing workflow system 100 of FIG. 1) interacting with cells (e.g., 104 and 106 of FIG. 1) of a production system. The product cell controller(s) 118, 118' for the cell receives batches 400, 402 from server 300 to be further processed by cells 104,106. Server 300 stores, in storage 304, at least one of the capabilities, capacities, utilization level, and excess capacity level of each cell in the print shop to produce different product-types by devices 404A-404C, 406A-406C. The Server 300 may also store, in storage 304, at least one of the capacities, capabilities, utilization level, and excess capacity level of the entire print shop to produce an additional print job. For example, the server 300 may have a job mix to produce a given number of print jobs. The print system as a whole may have excess capacity for a number of additional jobs for a given arrival and due date. Server 300 stores this information to determine if the system has the capabilities to process additional or excess document jobs.

Figure 5:
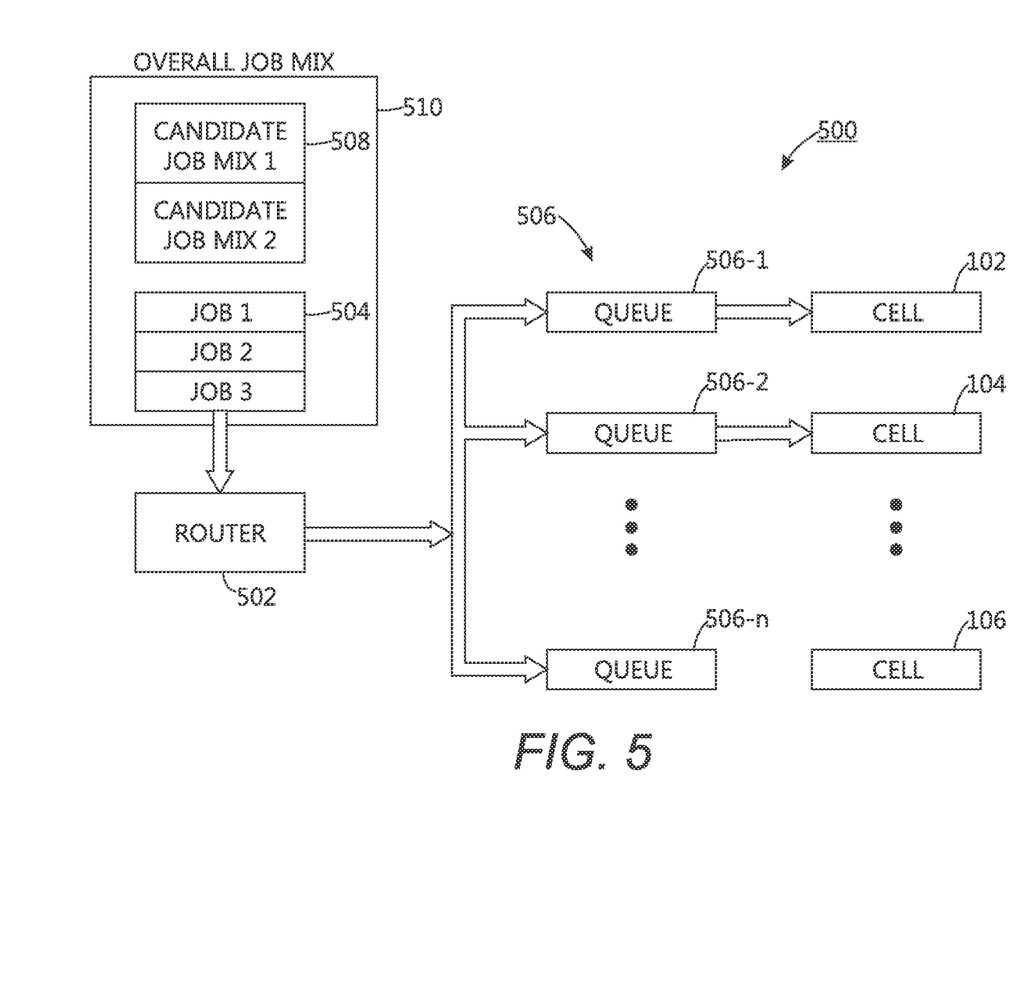
FIG. 5 is a block diagram illustrating an approach for routing jobs to cells by way of a corresponding series of queues.

Referring to FIG. 5, a simplified version of a job routing system 500, for use with the present embodiments, is illustrated. Router 502, which communicates with a bank of stored overall job mix which may include existing job mix 504 and candidate job mix 508, may include at least some of the job management capabilities associated with cell assignment module 120 (FIG. 2) and the LPPS 300 (FIG. 3). In one embodiment the overall job mix may be stored in a list or queue. When the print shop has excess capacity, candidate job mix 508 may be added to the bank of stored overall job mix 510. A candidate job mix is a collection of jobs that can be added to the overall job mix 510, should there be enough unused production capacity left in the shop. The router further communicates with a series of print processing related queues 506 (designated as 506-1, 506-2, . . . 506-n), which queues, in turn, are respectively operatively associated with cells 102 through 106.

The system takes into account both the existing job mix and the candidate job mix as well. To allow dynamic creation of jobs, the arrival and due dates of the candidate jobs are not fixed a priori. Instead, the temporal difference between a job's arrival and due dates (i.e., the "slack") is fixed. This allows for a maximum turnaround-time constraint.

A candidate job mix instance is an instantiation of a set of candidate jobs with their arrival and due dates determined. A candidate job mix instance is feasible, if none of these jobs are delayed when they are added to the overall job mix; otherwise it is called infeasible.

Set forth below is a first or basic algorithm used to compute the excess capacity, which may be used in determining the feasibility of adding a candidate job mix to the overall job mix. In one embodiment, the algorithm may be used to determine the excess capacity in a cellular manufacturing environment. The steps of this first algorithm for computing excess capacity include:

```
1.   Excess-Capacity ← ∅
2.   for t = t_min to t_max step Δt do
   a.   J' ← ∅                              /* J' is the candidate job
                                               mix instance */
   b.   foreach j ∈ J do                   /* J is the candidate job
                                               mix */
        i.   j' ← j
        ii.  j'.arrival ← j.arrival + t
        iii. j'.due ← j.due + t
        iv.  J' ← J' ∪ { j' }
   c.   if feasible(J') then
        i.   add J' to the overall job mix
        ii.  allocate resource for all j' ∈ J'
   d.   Excess-Capacity ← Excess-Capacity ∪ J'
3.   return Excess-Capacity
```

In this first algorithm, $t_{min}$ and $t_{max}$ specify a time period or interval minimum and maximum for how often the excess capacity may be computed, with $\Delta t$ being the time step, i.e. a step value, of a step function, for how much to adjust the fixed time interval t by, between two consecutive candidate job mix instances (excess-capacity jobs list). The step function may increase or decrease the fixed time interval. In one embodiment the fixed time interval between when a job mix instance arrives and the job mix instance is due for completion is defined as a slack time. The fixed time interval or slack time may be defined as in clock time or as a percentage of an average throughput of the jobs in the overall job mix. Job sets J and J' are the candidate job mix (excess jobs) and the candidate job mix instance, respectively. The foreach loop in Step 2.b instantiates all the jobs in J and creates or compiles a new excess job mix instance J', whose feasibility is tested in Step 2.c. In one embodiment, the jobs in J may be excess jobs and the candidate job mix instances may be an excess-capacity jobs list. In another embodiment an excess job mix compiler creates or compiles the new excess job mix instance J' and a feasibility test module determines the feasibility at the fixed time intervals of adding the excess jobs to an overall job mix using a computer operable processor. If J' is feasible, it is added to the overall job mix and the necessary production resources are allocated to accomplish all jobs in J'. By definition, a feasible J' means none of the jobs in J' are delayed. In one embodiment, an excess job list updater adds J', excess job mix instance, to an excess-capacity jobs list, if at least one or a minimum number of excess job instances are determined feasible. Thus, the excess capacity should include all jobs in J' (as is done in Step 2.c.ii), since it does not increase the number of late jobs for the shop.

In at least one embodiment, feasibility may include job mix instances that are mostly on-time but occasionally late. This is particularly useful for large candidate job mixes in which having a few late jobs would be acceptable, as long as the overall percentage of late jobs is small. Accordingly, jobs of the candidate job mix that cause delay or increase the number of late jobs for the shop may be added to the overall job mix.

In another embodiment, the feasibility test can be modified to take into account metrics such as the average turnaround time, maximum or average lateness, and other statistics that go beyond the number of late jobs.

The above first algorithm may reveal not only how many jobs can be readily inserted into the overall job mix without incurring any delay, but also when these jobs should take place. Such information allows shop operators to reduce or even eliminate the excess capacity of their shops in a way that preserves the overall efficiency of the shop. The basic algorithm adopts an optimization principle that changes the allocation of a resource to a set of individuals that is an improvement for at least one and no worse for any other. The described first algorithm further allows choosing a population, such as a maximum population, in determining the feasibility and excess capacity.

Figure 6:
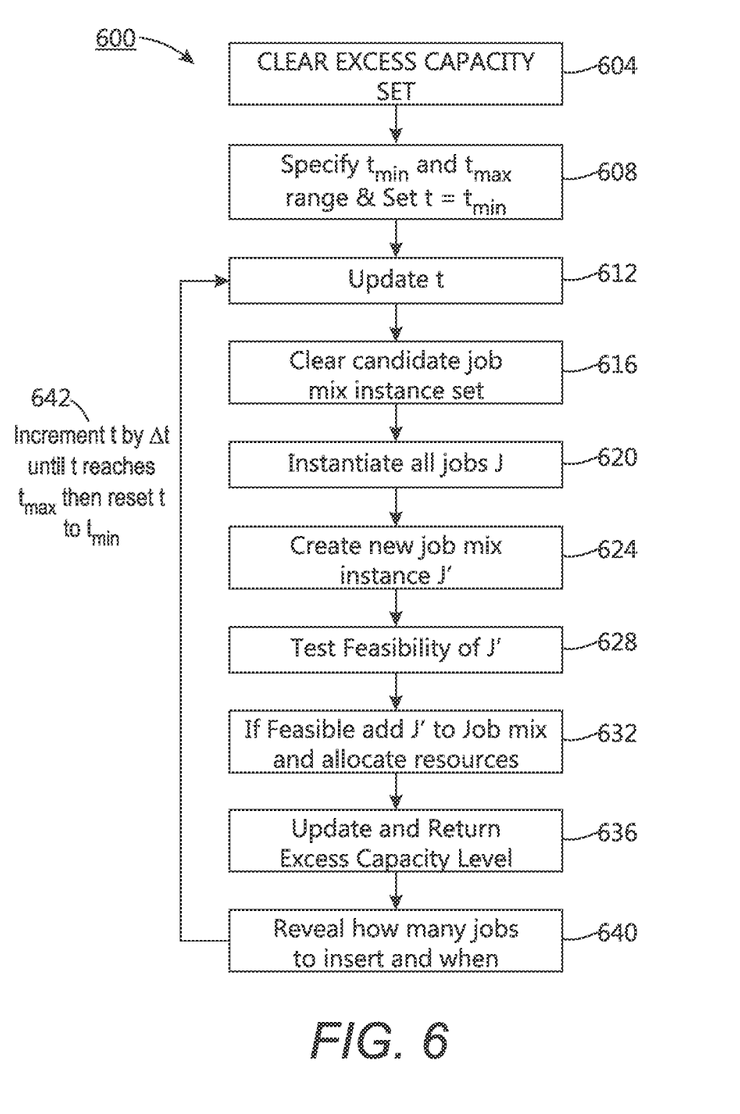
FIG. 6 is a flow diagram for a first or basic algorithm for computing excess capacity.

Turning to FIG. 6 illustrated is a high level flow diagram 600 defining steps to accomplish the system and method. Thus, process flow 600 includes the steps of:

1. Clearing the Excess-Capacity data set/list of any elements (604);
2. Specifying the range for $t_{min}$ and $t_{max}$ and setting t equal to $t_{min}$ (608);
3. Updating of t (612);
4. Clearing the candidate job mix instance set of any elements (616);
5. Instantiating all jobs J (620);
6. Creating a new excess job mix instance J' (624);
7. Testing the feasibility of J' (628);
8. Then if feasible adding J' to the Job Mix and allocate the necessary resources (632);
9. Updating and returning excess capacity levels (636);
10. Revealing how many jobs to insert and when to insert the jobs (640);
11. Incrementing t by Δt until t reaches $t_{max}$ then resetting t to $t_{min}$ and looping back to update t (642);

In one embodiment, the algorithm may be run in parallel on a plurality of processors. While the first described algorithm is implemented on at least one processor and returns the correct results, in some embodiments it may not be the most efficient manner of obtaining the results, especially if the time step Δt used is small. This is because testing for the feasibility of the candidate job mix instance J' in Step 2.c can be computationally expensive, and if there are too many such tests, the performance of the basic algorithm will suffer. Therefore, to reduce the number of feasibility tests, in one embodiment another algorithm is disclosed as follows:

```
1.   Excess-Capacity ← ∅
2.   Δt ← Δt_min                            /* Δt_min is the minimum
                                               time step*/
3.   for t = t_min to t_max step Δt do
   a.   J' ← ∅                              /* J' is the candidate job
                                               mix instance */
   b.   foreach j ∈ J do                   /* J is the candidate job
                                               mix */
        i.   j' ← j
        ii.  j'.arrival ← j.arrival + t
        iii. j'.due ← j.due + t
        iv.  J' ← J' ∪ { j' }
   c.   if feasible(J') then
        i.   add J' to the overall job mix
        ii.  allocate resource for all j' ∈ J'
        iii. Excess-Capacity ← Excess-Capacity ∪ J'
        iv.  if Δt > Δt_min then Δt ← max(Δt_min, Δt / 2) /* halve Δt,
             no less than Δt_min */
```

| | |
|---|---|
| d. | else if Δt < Δt$_{max}$ then Δt ←min(Δt$_{max}$, Δt * 2)   /* double Δt, up to Δt$_{max}$ */ |
| 4. | return Excess-Capacity |

This next algorithm is also run on one processor or a plurality of processors and dynamically adjusts the time step Δt to avoid frequent feasibility testing of J' as follows: Δt is doubled for each failed feasibility test; otherwise Δt is halved. In addition, Δt$_{min}$ and Δt$_{max}$ limit the range of Δt. The advanced algorithm is robust for tiny time steps, because smaller values of Δt have a higher chance to fail the feasibility test and since Δt is doubled every time such a failure occurs, it will quickly take on a value where the chance of passing the feasibility test is high. This allows the algorithm to avoid the peak production hours, in order to insert candidate jobs that are feasible. On the other hand, if the algorithm approaches the off-peak hours, the chance of passing a feasibility test becomes higher, and thus Δt is reduced (in Step 3.c.iv) to allow fine-grained probing in the feasibility space of the candidate jobs.

Figure 7:
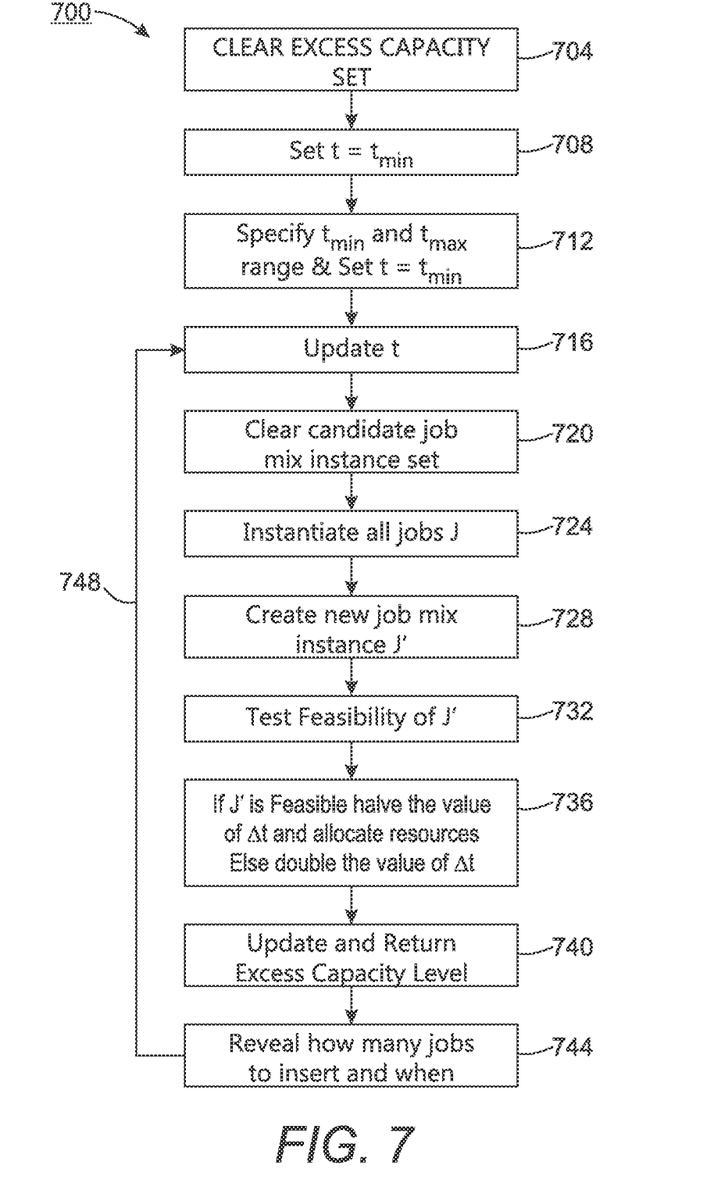
FIG. 7 is a flow diagram for another or advanced algorithm for computing excess capacity.

Turning to FIG. 7 illustrated is a high level flow 700 defining steps to accomplish the system and method. Thus, process flow 700 includes:
1. Clearing the Excess-Capacity data set of any elements (704);
2. Setting t equal to t$_{min}$ (708);
3. Specifying the range for t$_{min}$ and t$_{max}$ and setting t equal to t$_{min}$ (712);
4. Updating of t (716);
5. Clearing the candidate job mix instance set of any elements (720);
6. Instantiating all jobs J (724);
7. Creating a new job mix instance J' (728);
8. Testing the feasibility of J' (732);
9. Then if J' is feasible the value of Δt is halved and resources are allocated or else the value of Δt is doubled (736);
10. Updating and returning excess capacity levels (740);
11. Revealing how many jobs to insert and when (744);
12. Looping back to update t (748);

In at least one embodiment the second algorithm assumes Δtmin=0 by adding a constant term in steps 708, 712, or 736.

In at least one embodiment, the basic algorithm or the advanced algorithm may be used to convert the revenue or profit loss of excess-capacity jobs (i.e., those jobs that can be successfully added without incurring any delays) into their corresponding revenue or profit dollar amounts.

Figure 8:
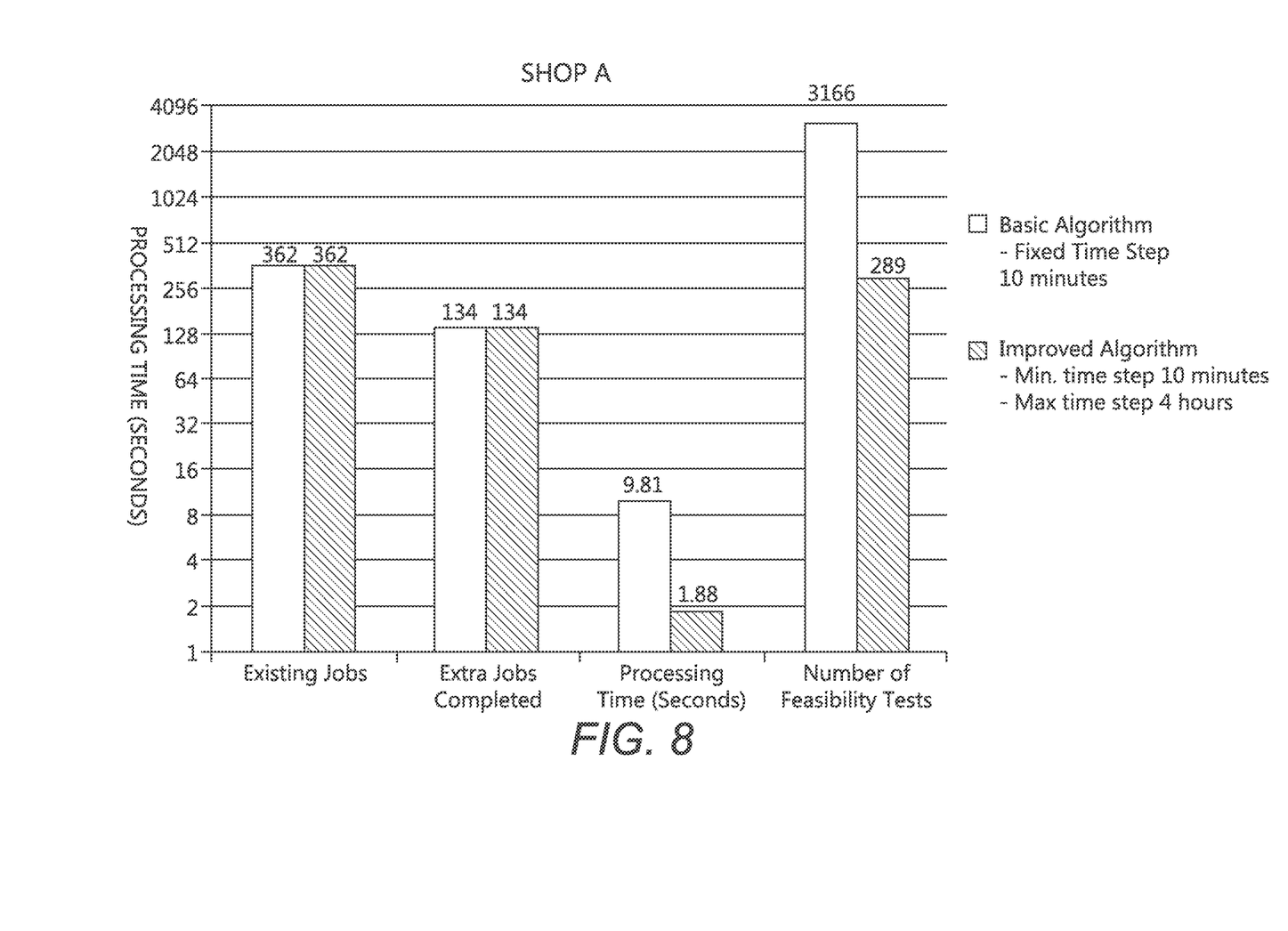
FIG. 8 presents a graph showing the difference in results between the basic algorithm and advanced algorithm.
Figure 9:
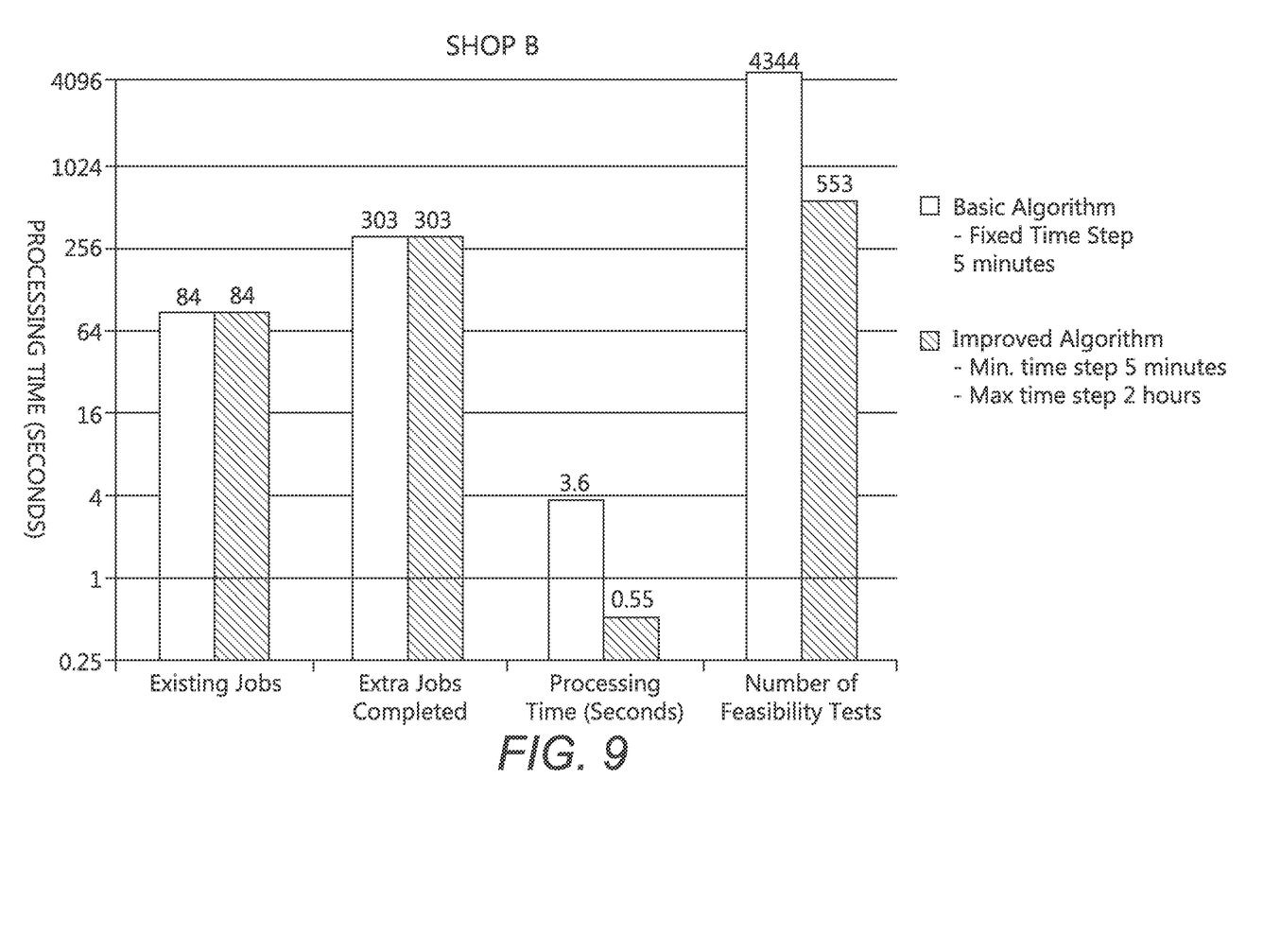
FIG. 9 presents a graph showing the difference in results between the basic algorithm and advanced algorithm.
Figure 10:
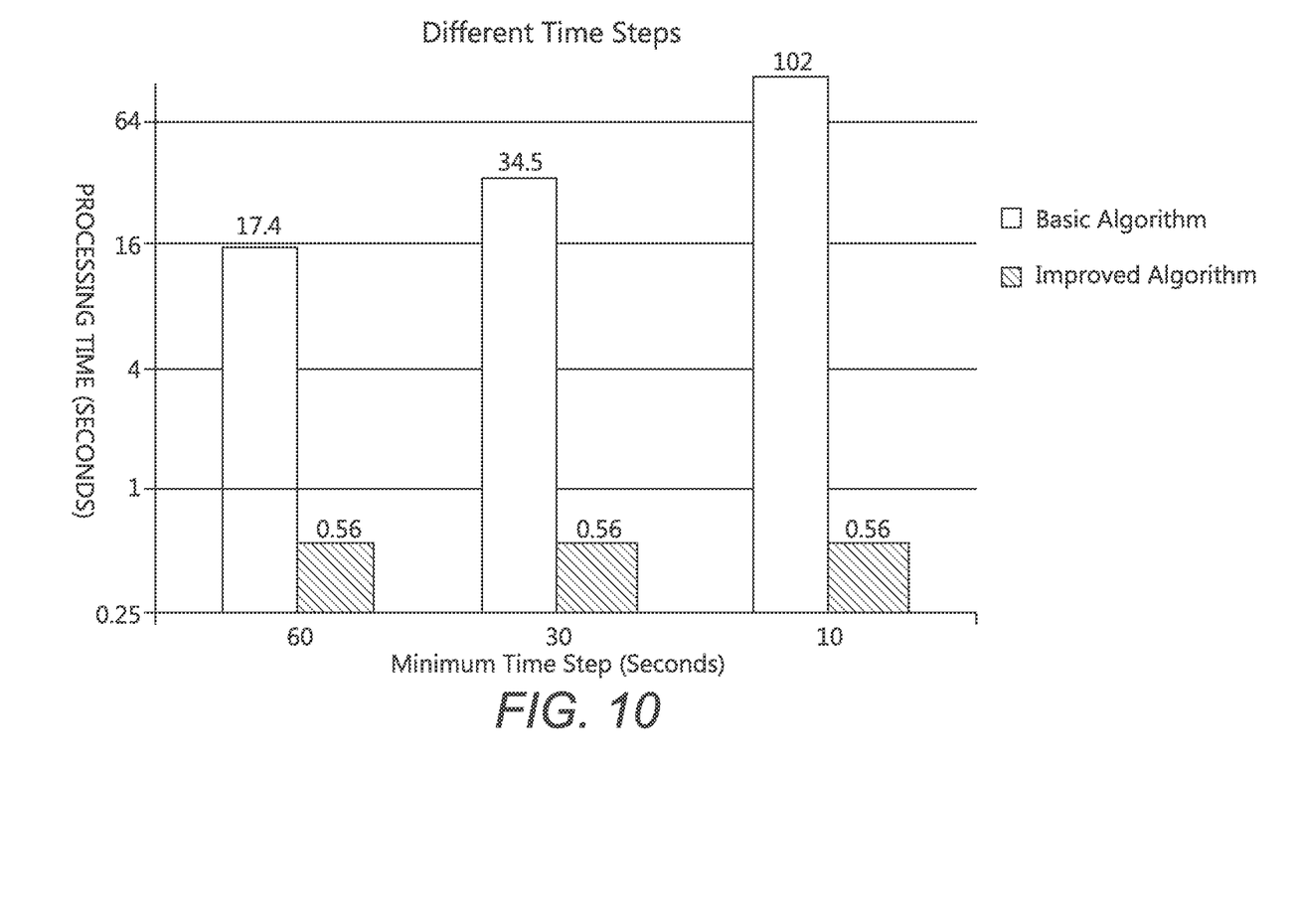
FIG. 10 presents a graph showing the difference in results between the basic algorithm and advanced algorithm for different time steps.

Referring to FIGS. 8-10, exemplary results of the basic and advanced algorithms are compared. As shown in chart 800 of FIG. 8, to evaluate the performance of the basic and advanced algorithms, both algorithms were tested on the Shop A with 362 existing jobs. A fixed time step of 10 minutes for the basic algorithm was used. For the advanced algorithm, a minimum time step of 10 minutes and maximum time step of 4 hours were used. As shown, both versions managed to add 134 extra jobs to the existing workload without a single delay. However, the basic version took 9.81 seconds on a Xeon E5405 2.0 GHz processor; whereas the advanced algorithm took only 1.88 seconds on the same machine (5.2× faster). The performance gap widens when the number of feasibility tests for candidate job mix instances is considered: the basic version had 3166 tests; whereas the advanced algorithm had only 289 tests (11× fewer), yet both have the same number of successful tests.

As shown in chart 900 of FIG. 9, the basic and advanced algorithms were similarly tested on a Shop B with 84 existing jobs. Both the basic and the advanced algorithms were able to add 303 new jobs without a single delay. 5 minutes was used as the fixed time step for the basic version. The range of the dynamically adjustable time step for the advanced algorithm was between 5 minutes and 2 hours, inclusive. The basic algorithm finished in 3.6 seconds; whereas the advanced algorithm took only 0.55 seconds (6.5× faster). The basic algorithm had 4344 feasibility tests; whereas the advanced algorithm had only 553 tests (7.9× fewer). The schedules found by both algorithms had the same quality in terms of make span, average lateness, average processing time, and average turnaround time, among other metrics.

As shown in chart 1000 of FIG. 10, the basic and advanced algorithms were testes for robustness using tiny time steps. Both algorithms were tested with minimum time steps of 1 minute, 30 seconds, and 10 seconds on the Shop B. The advanced algorithm finished the calculations for each of the time steps in 0.56 seconds, i.e. the same processing time regardless of the value of the minimum time step used. The basic algorithm took 17.4, 34.5, and 102 seconds, respectively.

Additionally in at least one embodiment, high-workload shops with a significant number of late jobs that use either the basic algorithm or the advanced algorithm are able to insert an extensive set of jobs without causing any extra delays. In one embodiment, the basic and advanced algorithms may be used for over utilized print shops to insert additional print jobs. Furthermore, the computed capacity can be easily grounded in business terms such as revenue or profit loss due to resource underutilization or overutilization.

The present application also includes a system that utilizes the aforementioned methods for the dynamic creation of candidate job mixes for computing excess capacity. The system, in certain embodiments, is configured to place a dollar value on excess capacity of a system or print shop. In this embodiment the system is designed to associate a dollar value with a percentage of excess capacity. For example, for each percentage of excess capacity will be equated with X dollars. Then it is simply a matter of determining the excess capacity and multiplying that value times the X dollars.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for determining the excess capacity of a cellular manufacturing environment, the method comprising:
providing an overall job mix including at least existing jobs to be processed;
determining feasibility, at a fixed time interval, of adding at least one excess job to the overall job mix; and
adding the at least one excess job to an excess-capacity jobs list, if and only if the at least one excess job is determined feasible, wherein feasibility is based on determining if adding the at least one excess job instance delays at least one job in the overall job mix, and the method is performed by at least one processing device.

2. A method for determining the excess capacity of a cellular manufacturing environment, the method comprising:
clearing an excess capacity list;
specifying a time interval minimum and maximum for how often to test feasibility of adding at least one excess job to an overall job mix;
compiling a list of at least one excess job mix instance;
determining the feasibility of adding the at least one excess job mix instance to an overall job mix list;
adding the at least one excess job instance to an excess-capacity jobs list, if the at least one excess job instance is determined feasible;
wherein the feasibility is determined at fixed time intervals within the time interval minimum and maximum,
and wherein the method is performed by at least one electronic processing device.

3. The method according to claim 2, further comprising increasing the fixed time interval when it is determined not feasible to add at least one excess job instance to an excess-capacity jobs list.

4. The method according to claim 3, further comprising increasing the fixed time interval using a step function.

5. The method according to claim 2, further comprising decreasing the fixed time interval when it is determined feasible to add at least one excess job instance to an excess-capacity jobs list.

6. The method according to claim 5, further comprising decreasing the fixed time interval using a step function.

7. The method according to claim 2, further comprising allocating resources for the at least one excess job when the at least one excess job instance is determined feasible.

8. The method according to claim 2, further comprising determining when the at least one excess job instance in the excess-capacity jobs list is feasible to implement.

9. The method according to claim 8, further comprising presenting the number of excess job instances in the excess-capacity jobs list and when it is feasible to implement the at least one excess job instance.

10. The method according to claim 2, further comprising determining the feasibility based on at least one of the average turnaround time, maximum lateness, and average lateness.

11. The method according to claim 2, further comprising determining on a first processor the feasibility of adding the at least one excess job mix instance to an overall job mix list and determining on a second processor the feasibility of adding the at least one excess job mix instance to an overall job mix list.

12. The method according to claim 11, wherein the first processor and second processor determines the feasibility in parallel.

13. The method according to claim 2, further comprising:
a job mix instance slack time;
wherein the slack time comprises a fixed time interval between when a job mix instance arrives and the job mix instance is due for completion; and
wherein the determining assumes each of the at least one excess job instance has a slack time.

14. The method according to claim 2, further comprising adding the at least one excess job instance an excess-capacity jobs list, if the at least one excess job instance is infeasible.

15. The method according to claim 2, wherein determining feasibility is based on determining if adding the at least one excess job instance delays at least one job in the overall job mix.

16. The method according to claim 2, wherein the time interval minimum and maximum is a percentage of an average throughput of jobs in the overall job mix.

17. A system for determining excess capacity of a cellular manufacturing environment, the system comprising:
an excess job mix compiler for compiling a list of at least one excess job mix instance;
a feasibility testing module for determining the feasibility at fixed time intervals of adding the at least one excess job to an overall job mix using a computer operable processor;
a dynamic time step value;
an excess job list updater for adding the at least one excess job instance to an excess-capacity jobs list, if the at least one excess job instance is determined feasible;
wherein the feasibility testing module determines the feasibility at a fixed time interval; and
wherein the fixed time interval is adjusted based on the dynamic time step value; and
wherein feasibility is based on determining if adding the at least one excess job instance delays at least one job in the overall job mix.

18. The system according to claim 17, further comprising a translating module for translating the feasibility of adding at least one excess job to an overall job mix into at least one of revenue or profit loss terms.

19. The system according to claim 17, wherein the dynamic step value is halved if the feasibility testing module determines it is feasible to add the at least one excess job to the overall job mix.

20. The system according to claim 17, wherein the dynamic step value is doubled if the feasibility testing module determines it is not feasible to add the at least one excess job to the overall job mix.

* * * * *